W. S. CRAIG.
CREEPING AND ANTISKIDDING DEVICE.
APPLICATION FILED DEC. 7, 1910.
1,015,545.
Patented Jan. 23, 1912.
2 SHEETS—SHEET 2.
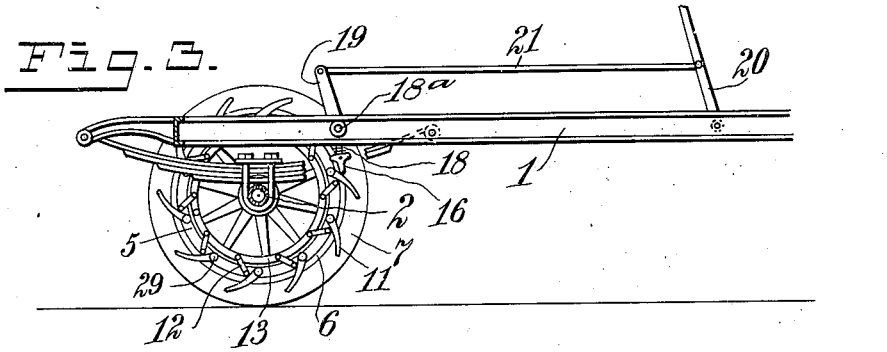
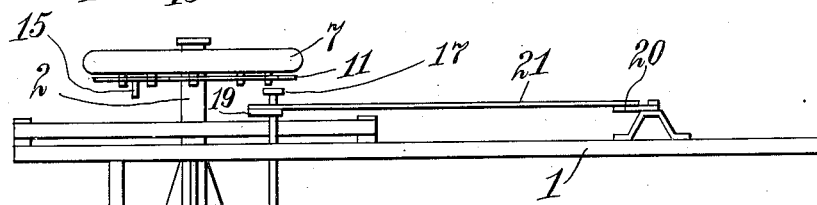
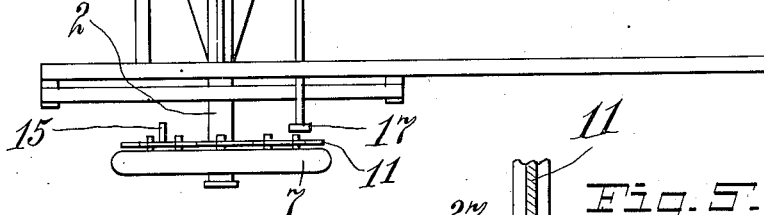
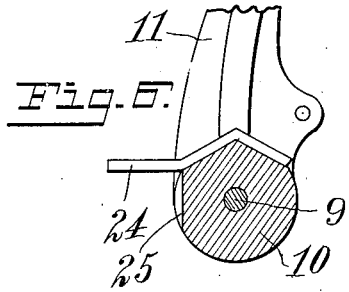
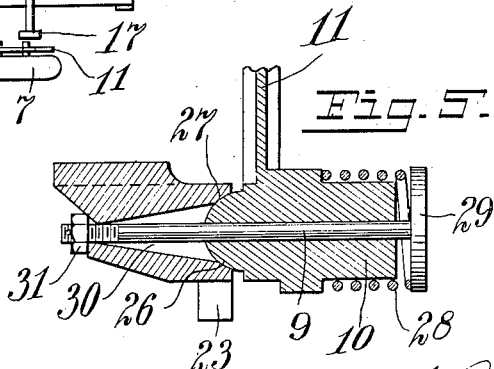

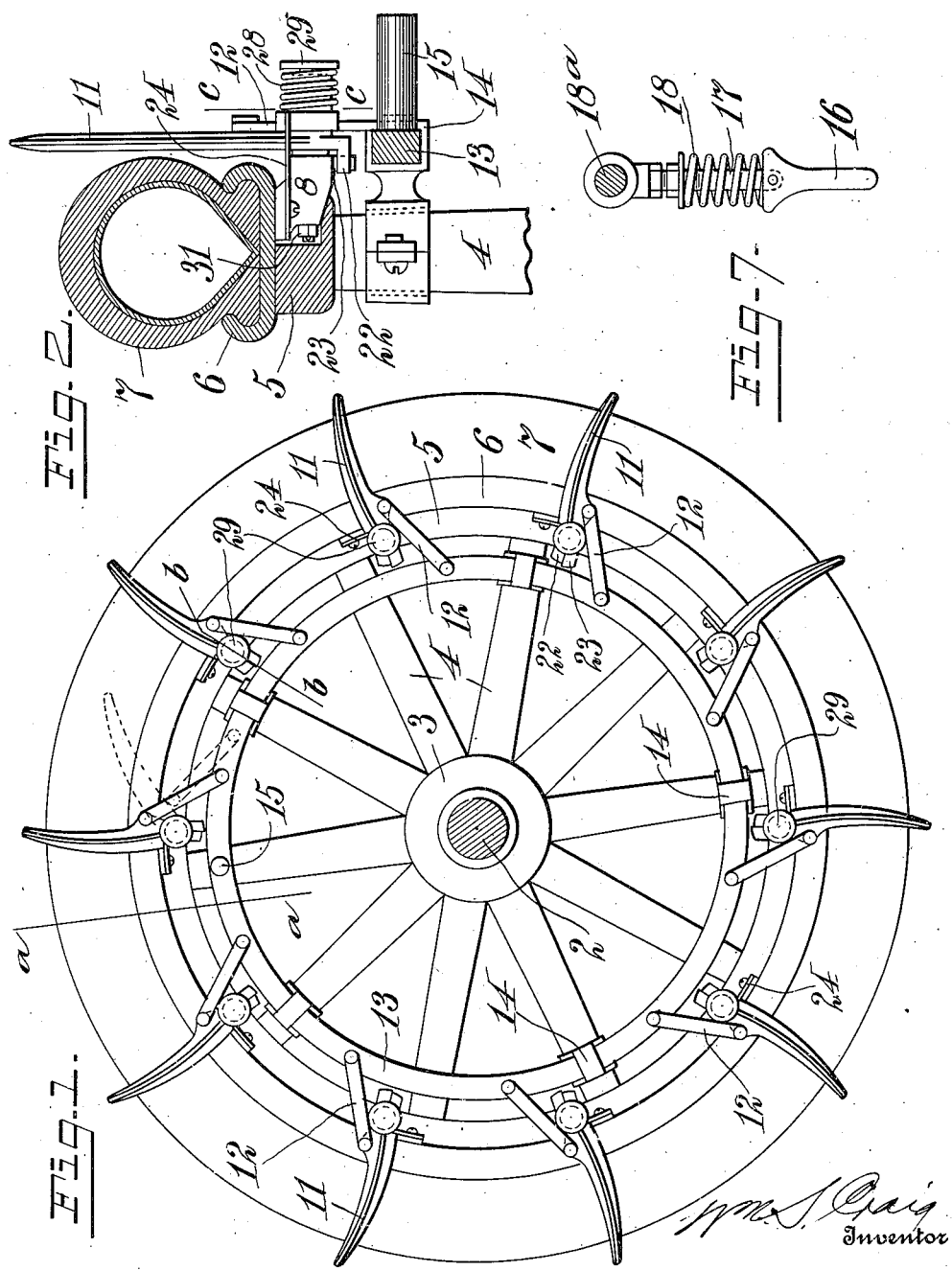

UNITED STATES PATENT OFFICE.

WILLIAM S. CRAIG, OF ST. MARYS, OHIO.

CREEPING AND ANTISKIDDING DEVICE.

1,015,545.  Specification of Letters Patent.  Patented Jan. 23, 1912.

Application filed December 7, 1910. Serial No. 596,005.

*To all whom it may concern:*

Be it known that I, WILLIAM S. CRAIG, a citizen of the United States, residing at St. Marys, in the county of Auglaize and State of Ohio, have invented certain new and useful Improvements in Creeping and Antiskidding Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in anti-skidding devices for automobile wheels.

The object of the invention is to provide a device of this type that may be attached to an automobile wheel, and which will, when placed in an operative position, prevent the wheels slipping on ice and snow, or sidewise, when the machine is going around a curve, as hereinafter set forth in the description and drawings, and pointed out in the claims.

Referring to the drawings, Figure 1 is a side elevation of an automobile wheel equipped with the invention; Fig. 2 is a section on the line *a—a* of Fig. 1; Fig. 3 is a longitudinal section of an automobile chassis, showing the operating or setting mechanism; Fig. 4 is a top plan view of the same; Fig. 5 is a section on the line *b—b* of Fig. 1; Fig. 6 is a section on the line *c—c* of Fig. 2; and Fig. 7 is a detail view of the trip device.

Referring more particularly to the drawings, 1 represents the frame of an automobile provided with a rear axle 2, on the outer ends of which are mounted the usual automobile wheels. Each of these wheels consists of a hub 3, spokes 4, felly 5, rim 6 and tire 7. The wheels as above described, are well known parts of an automobile, and during the operation of the automobile, said wheels are subject to slipping on ice and snow and to skidding when making a curve. To obviate these objections, the following attachment is provided. Mounted on the rim 6 is a plurality of bearings 8, and passing through each of these bearings is a pintle 9 on the outer end of which is mounted a hub 10 provided with a spur 11. The spur 11 is, therefore pivotally mounted on the pintle 9, and is adapted to be thrown in and out of an operative relation with the ground. In Fig. 1, the spurs are shown in an operative position in full lines, and the upper spur is shown in an inoperative position in dotted lines. The spurs 11 are thrown in and out of position as follows: All of the spurs 11 are connected by means of links 12, to a ring 13 mounted in bearings 14 attached to the spokes 4. It will be seen that, when the ring 13 is shifted in one direction, the spurs 11 will be thrown to an operative position, and when the ring is shifted in the opposite direction, the spurs will be thrown to an inoperative position. The ring is shifted as follows: Mounted on said ring 13 is a pin 15 adapted to be engaged by a trip 16, as is shown in Figs. 3 and 4. The trip 16 is pivotally mounted on an arm 17, and is held in a central position by means of a spring 18. The spring 18 allows the pin 15 to pass the trip 16, but is of sufficient tension to shift the ring 13. There is a trip 16 and an arm 17 for each rear wheel, and the arms 17 are mounted on a rock shaft 18ª journaled in the frame. The shaft 18ª is provided with an arm 19 connected to a hand lever 20 by a rod 21. It will be seen that, when the trip 16 is placed in operative relation with the pin 15, the ring 13 and the spurs 11 will be shifted from one position to the other. The arrangement is such that when the machine is going forward and the trip is placed in a position to engage the pin 15, the spurs will be thrown from an inoperative to an operative position; and when the direction of the machine is reversed, the spurs will be thrown to an inoperative position. When the spurs 11 are in an operative position and are engaging the ground, the strain incidental thereto is received by lugs 22 on the hubs 10 engaging lugs 23 on the bearings 8, thereby limiting the movement of the spurs. The spurs 11 are held in either of their positions by means of leaf springs 24 which engage hexagonal portions 25 of the hubs 10. These springs 24 prevent the spurs 11 being shifted by the jarring of the machine; and being of a resilient nature, permit the spurs to be shifted positively by the trip 16.

To prevent the spurs being injured when striking a stone or the like, said spurs are capable of a slight lateral movement which is accomplished as follows. The hubs 10 are provided with ball portions 26 which fit in sockets 27 in the bearings 8. Said hubs 10 are capable of a longitudinal movement on the pintle 9, in addition to their rocking movement; and the ball portions 26 are held within the socket portions 27 by springs 28, which engage heads 29 on the outer ends of the pintles 9. The bearings 8 are provided with conical openings 30, through which the pintles 9 pass, said pintles being provided with nuts 31 on their inner ends. It will be seen that the pintles 9 are capable of a rocking movement in the bearings 8, which allows the outer ends of the spurs 11 to rock laterally and pass to the side of an obstruction, while the springs 28 tend to hold the spurs in a normal position.

I claim:

1. In a device of the type specified, the combination with a wheel, of a series of bearings comprising socket members mounted thereon, a corresponding series of bearings comprising hubs with ball portions engaging said socket members, a spur rigidly united to each of said hubs, a pintle projected through axial openings in the socket and hub members and whereon said hub has a rocking and longitudinal movement which enables the spur to have the necessary movement, and means for rocking all of the spurs simultaneously through the movement of the hub members of the bearings, substantially as specified.

2. An automobile wheel having the usual rim supporting a rubber tire, an oscillating ring mounted in bearings on the spokes of said wheel adjacent to said rim, a pin projecting laterally from said ring, socket bearings extending laterally from said rim, a series of spurs having heads provided with ball portions adapted to enter said sockets, said spurs being adapted to be projected beyond the circumference of the tire, a series of links connecting said spurs and said ring, headed pins penetrating the heads of the spurs and their socket bearings, a resilient member mounted between each of the spurs and pin heads, thereby allowing the spurs to have a flexible lateral movement, a second resilient member engaging each spur head and adapted to hold the spurs in a set position, and means for shifting said ring to rock said spurs in a body to and from operative positions.

In testimony whereof I affix my signature, in presence of two witnesses.

WILLIAM S. CRAIG.

Witnesses:
  GEORGE MEYERS,
  JACOB T. KOENIG.